United States Patent [19]

Davie, Jr. et al.

[11] 4,125,190

[45] Nov. 14, 1978

[54] CHILD-RESISTANT BLISTER PACKAGE

[75] Inventors: John H. Davie, Jr., Gladwyne; Martin E. Hulick, Berwyn; Stephen J. Verespy, Jr., Philadelphia, all of Pa.

[73] Assignee: Sharp Corporation, Conshohocken, Pa.

[21] Appl. No.: 821,333

[22] Filed: Aug. 3, 1977

[51] Int. Cl.² .................... B32B 31/00; B65D 83/04
[52] U.S. Cl. .................... 206/532; 156/290; 206/462; 206/469
[58] Field of Search .................... 206/461–462, 206/467, 469, 471, 528, 530–532, 601, 604, 634; 229/69; 156/290

[56] References Cited

U.S. PATENT DOCUMENTS

| | | | |
|---|---|---|---|
| 2,968,391 | 1/1961 | Sparks | 206/532 |
| 2,993,590 | 7/1961 | Denton | 206/469 |
| 3,054,503 | 9/1962 | Hartman, Jr. et al. | 206/531 |
| 3,282,413 | 11/1966 | Sparks | 206/462 |
| 3,494,322 | 2/1970 | Dubbels | 206/462 X |
| 3,809,221 | 5/1974 | Compere | 206/531 |
| 3,905,479 | 9/1975 | Gerner et al. | 206/531 |

FOREIGN PATENT DOCUMENTS 1,301,501  12/1972  United Kingdom .................... 206/531

*Primary Examiner*—Steven E. Lipman
*Attorney, Agent, or Firm*—George A. Smith, Jr.

[57] ABSTRACT

A foil-backed blister sheet is sandwiched between upper and lower sheets formed by folding a single die-cut card having a heat-sealable adhesive coating on one side. Blisters project through holes in the upper sheet, and the blister contents are removed by pushing them through the foil backing and through holes in the lower sheet. The lower sheet is smaller than the upper one, and the upper and lower sheets are connected together by narrow hinge sections so that a margin area coated with heat-sealable adhesive is presented on the underside of the upper sheet. A third card having a tear strip, which must be removed to gain access to the blister contents, is heat-sealed to the upper card at the margin area. The upper surface of the third card is uncoated paperboard, which readily adheres to the margin area when sealing heat is applied.

10 Claims, 8 Drawing Figures

CHILD-RESISTANT BLISTER PACKAGE

BRIEF SUMMARY OF THE INVENTION

This invention relates to blister packaging, and particularly to a child-resistant blister package suitable for containing and individually dispensing medicinal tablets, capsules and similar articles.

Conventional blister packages for medicinal products are well-known. A typical blister package construction is illustrated in U.S. Pat. No. 3,397,671 to M. D. Hartman, Jr., et al., dated Aug. 20, 1968. The blister package shown in the Hartman et al. patent comprises a clear plastic blister sheet of a material such as polyvinyl chloride having a plurality of blisters projecting from one face thereof and having openings in the opposite face. Each blister is adapted to contain a medicinal tablet or capsule. A sheet of metal foil, such as aluminum foil is adhered to the face of the plastic sheet opposite the blisters in order to close the openings, thereby enclosing the capsules or tablets. In a typical package, the foil sheet is backed by paper, and the combination of paper and foil is known as "supported foil." The foil-backed blister sheet is sandwiched between upper and lower paperboard layers, the upper layer having holes for receiving the blisters, and the lower layer having corresponding holes in registry with the openings of the blisters. The upper and lower paperboard sheets are typically formed from a die-cut paperboard card having a heat-sealable adhesive coating on one side thereof. The card is folded to enclose the foil-backed blister sheet so that the heat-sealable coatings on the two sheets face each other. The margins outside the periphery of the foil-backed blister sheet are then heat-sealed together to produce the complete package.

Tablets or capsules are removed from the conventional blister package by pushing manually against the blisters to force the blister contents through the foil backing and through the corresponding holes in the lower paperboard sheet. While the conventional blister package is convenient to use, unfortunately it is also easy for a child to remove the blister contents from the package. A great deal of time and effort has been expended in the past in the development of various child-resistant blister packages, as is evident from the numerous patents issued on such packages. For example, the following patents illustrate blister packages which are expressly intended to be child-resistant:

U.S. Pat. Nos. 3,905,479 Gerner et al.; 3,912,082, Gerner et al.; 3,924,747, Gerner; 3,835,995, Haines; 3,912,081, Haines et al.; 3,924,746, Haines; 3,809,220, Arcudi; 3,809,221, Compere; 3,811,564, Braber; 3,872,970, Edison; 3,899,080, Brunda; 3,921,805, Compere; 3,941,248, Moser et al.

The child-resistant packages described in the foregoing patents depart markedly in construction from the conventional blister package, and some, such as Compere U.S. Pat. Nos. 3,809,221 and Gerner et al. 3,905,479, utilize special Mylar layers. Thus, in the manufacture of these packages, it has been generally necessary to utilize either special machinery, or special materials, or both.

The principal object of the present invention is to provide an effective child-resistant package which consists of inexpensive, conventional materials, and which can be manufactured by the use of conventional machinery of the type used in the manufacture of the conventional blister package described above.

This object, and other objects of the invention which will become apparent from the detailed description herein, is accomplished essentially by the utilization of a third paperboard sheet in conjunction with a blister card, the construction being briefly as follows.

The child-resistant blister package in accordance with the invention, comprises a sheet of clear plastic having at least one, and typically a plurality of blisters formed therein, projecting from one face thereof, and having openings in the opposite face thereof. Each blister contains a medicinal tablet or capsule or similar article. A foil sheet is secured to one side of the plastic sheet, and encloses the openings of the blisters, the foil sheet being rupturable upon manual compression of a blister containing an article. A first paperboard sheet, overlies the face of the plastic sheet from which the blisters project, and has a hole for each blister. Each of the blisters projects through one of said holes. A second paperboard sheet, overlying the foil sheet, has a hole for each blister, each hole being in registry with an opening of one of the blisters. The blister package is characterized by the presence of a third paperboard sheet overlying the second paperboard sheet, the third paperboard sheet having perforations forming tear strip means overlying the holes of the second paperboard sheet; said third paperboard sheet having sufficient thickness to prevent the article within a blister from being pushed through the foil sheet upon manual compression of the blister while the tear strip is in place behind the blister.

In the preferred form of the invention, the third and the first sheet extend beyond the borders of the second sheet throughout substantially the entire periphery of the second sheet to form a margin area. The first and third sheets are secured together by an adhesive within the margin area. Also, in the preferred form of the invention, the first and second sheets are coated with a heat-sealable adhesive, and are heat-sealed together within an area outside the borders of the plastic and foil sheets. The third sheet has an uncoated face, which is adhered to the first sheet within the margin area surrounding the second sheet by heat-sealing. This structure provides an excellent means for securing a paperboard backing sheet in place, and also allows the second and third sheets to be heat-sealed to the first sheet in a single heat-sealing step.

To facilitate alignment of the holes, the first and second sheets are preferably die-cut from a single paperboard sheet, and are integrally connected together. The connection is made through at least two narrow hinge sections which are spaced from each other, and which allow the margin area for attachment of the third sheet to the first sheet to extend substantially completely around the second sheet, with only minor discontinuities.

Certain important aspects of the invention reside in the construction of the card itself, from which the first and second paperboard sheets are formed. In particular, the card is characterized by a pair of paperboard sheets, integrally connected together by at least two narrow hinge sections, the dimensions of the respective sheets being such that when one is folded over on the other, a margin area of one sheet is presented which extends substantially entirely around the periphery of the other sheet, the margin area being coated by a heat-sealable adhesive extending substantially entirely around the periphery of the smaller sheet.

The invention is also considered to reside in the method by which the child-resistant blister package is made. This method is characterized by the steps of providing a first paperboard sheet having one or more holes, and a heat-sealable adhesive coating on the face thereof, positioning a foil-backed blister sheet on the adhesive-coated side of said first sheet with its blisters extending through the holes, positioning a second paperboard sheet, having a pattern of holes corresponding to the pattern of holes in the first sheet, against the adhesive-coated side of the first sheet with corresponding holes in coaxial alignment, thereby clamping the foil-backed blister sheet between the first and second sheets, heat-sealing the first and second sheets together, and securing a third paperboard sheet having tear strip means against the exposed face of the second sheet.

In its preferred form, the method in accordance with the invention is carried out by securing the third paperboard sheet against the exposed face of the second sheet by heat-sealing the third sheet to a margin area of the first sheet, the margin area extending beyond the borders of the second sheet throughout substantially the entire periphery thereof. Preferably, the method is characterized by the formation of a heat-sealed zone extending substantially completely around the periphery of the second sheet. Desirably the third sheet is secured against the exposed face of the second sheet by heat-sealing the third sheet to the margin area of the first sheet in the same heat-sealing step by which the first and second sheets are secured together.

Also, the method is carried out preferably by the use of first and second sheets formed from a single sheet of paperboard having a heat-sealable adhesive coating on one side thereof, and integrally connected to each other by a pair of narrow, spaced hinge sections.

The method is also preferably carried out by using a third sheet which is uncoated at least on one side thereof, in order to insure a secure sealing of the third sheet to the first sheet within the margin area surrounding the second sheet.

The child-resistant blister package has achieved excellent results in testing of its ability to prevent access by small children, while still permitting adults to open the package with relative ease. The package is believed advantageous in that it achieves these results while utilizing what is essentially conventional blister package machinery, and inexpensive materials in its production.

Various objects other than those specifically mentioned, and further details of the invention will be apparent from the following detailed description, when read in conjunction with the drawings.

DETAILED DESCRIPTION

Figure 1:
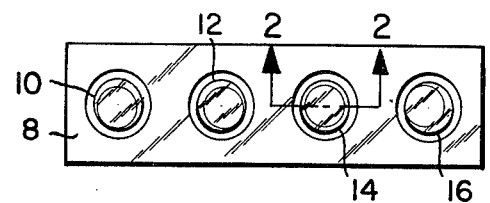
FIG. 1 is a top plan view of a foil-backed clear plastic blister sheet comprising part of the package in accordance with the invention.
Figure 2:
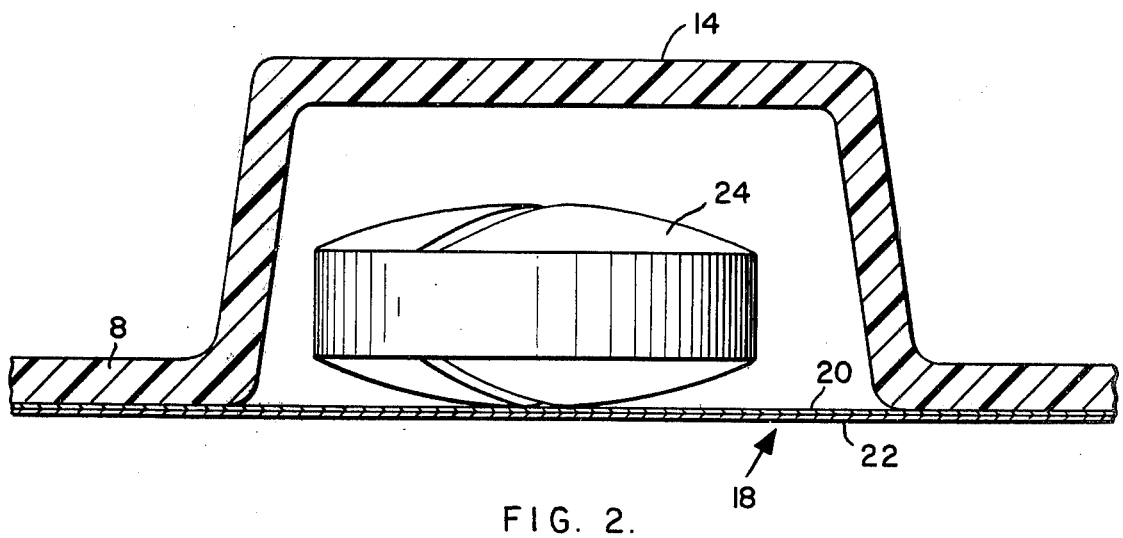
FIG. 2 is a vertical section on the plane 2—2 of FIG. 1.

FIGS. 1 and 2 show a foil-backed blister sheet 8 comprising a sheet of clear plastic, for example polyvinyl chloride, having a plurality of blisters 10, 12, 14 and 16 formed therein, and projecting from one face thereof. The openings of the blisters in the opposite face of the plastic sheet are enclosed by a foil sheet 18, which is preferably a supported foil sheet comprising an aluminum foil layer 20, backed by a paper layer 22. Each blister contains a medicinal tablet such as tablet 24 shown in FIG. 2.

The clear plastic sheet typically has a thickness of about 10 mil (0.010 inch), so that the blisters can be manually depressed, but cannot be opened easily by the use of fingernails. The aluminum foil layer 20 is typically of 1 mil thickness (0.001 inch), and the paper layer 22 is typically 15 pound bond, adhered to the aluminum foil layer 20 by a suitable adhesive. The foil layer 18 is preferably heat-sealed to the clear plastic sheet 8 by means of one of any number of conventional heat-sealable adhesives, for example polyethylene. If desired, however, adhesives other than heat-sealable adhesives may be used for this purpose.

The strength of the foil layer 18 is such that manual depression of a blister downwardly against the tablet contained in it easily pushes the tablet through the foil layer 18.

While a multiple-blister tablet-containing sheet is shown, the invention is applicable to blister sheets having only a single blister, and also to blister sheets holding products other than medicinal tablets.

The foil-backed blister sheet of FIGS. 1 and 2 is supported by a card comprising first and second paperboard sheets, the first sheet overlying the plastic sheet on the face from which the blister project, and having a plurality of holes through which the blisters project, and the second sheet overlying the foil sheet and having a corresponding second plurality of holes, each of the holes of the second plurality being in registry with an opening of one of the blisters. The card provides a convenient support for the foil-backed blister sheet, and can be printed with information concerning the nature and use of the medicinal preparation contained in the blisters.

Figure 3:
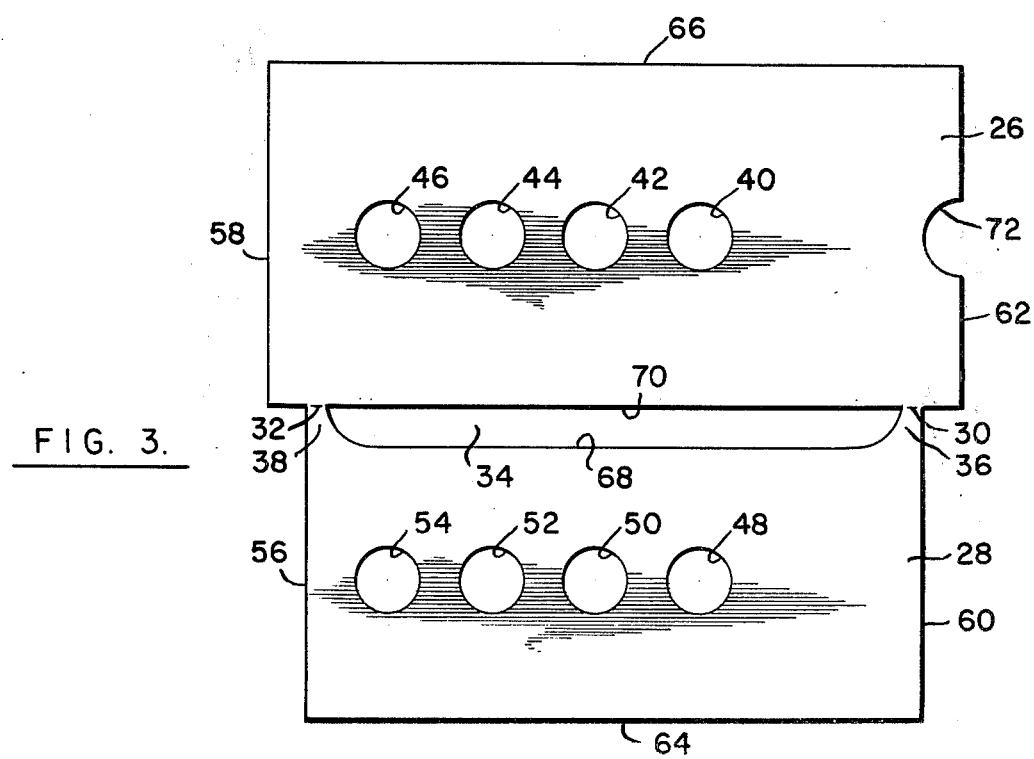
FIG. 3 is a top plan view of a card in accordance with the invention, for use in the construction of a child-resistant blister package.

The card is preferably formed from a single, flat sheet of solid bleached sulfate paperboard, die-cut in the configuration illustrated in FIG. 3. Preferably, the material is 10 point paper (0.010 inch) in thickness, and is coated on one side. Unless otherwise qualified, the term "coated" as used herein refers to the coating treatment of paperboard with one of a variety of chemical substances, usually clays or synthetic polymers, for the purpose of producing a hard, smooth surface thereon, in contrast to an absorbent blotter-like surface. The treatment normally includes passing the paperboard through a calender. Conversely, the term "uncoated" refers to the absence of such treatment, and to the blotter-like texture and appearance of a surface of a paperboard sheet.

As shown in FIG. 3, the card comprises a pair of sheets 26 and 28 which are adapted to be folded over on each other along a hinge defined by hinge lines 30 and 32. These sheets are typically rectangular, although not necessarily so. An elongated cut-out section 34 defines a pair of narrow, spaced hinge sections 36 and 38 which integrally connect sheets 26 and 28. Holes 40, 42, 44 and 46 are formed in sheet 26 for the purpose of receiving the blisters protruding from the upper face of plastic sheet 8 (FIG. 1). Corresponding holes 48, 50, 52 and 54 are formed in sheet 28, and positioned so that they coincide with holes 40, 42, 44 and 46 respectively when the sheets are folded over on each other along the hinge defined by lines 30 and 32.

The card of FIG. 3 is also die-cut so that edge 56 of sheet 28 is positioned inwardly with respect to edge 58 of sheet 26. Likewise, edge 60 is positioned inwardly with respect to edge 62. The distance between edge 64 and the hinge lines 30 and 32 is less than the distance between edge 66 and the hinge lines. While edge 70 is aligned with the hinge lines, edge 68 is laterally spaced therefrom. By reason of the relationship between these various edges, it will be seen that when the sheets are folded over on each other on the hinge lines, a margin area of sheet 26 is defined which extends substantially completely around the periphery of sheet 28. The only discontinuities in this margin area are those resulting from the presence of narrow hinge sections 36 and 38, and a semicircular notch 72 in sheet 26, the purpose of the notch being to provide easy access to a tear strip which will be described.

The entire face of the card seen in FIG. 3 is covered with polyethylene or another suitable heat-sealable adhesive so that sheets 26 and 28 can be secured together by heat-sealing within a margin area outside the periphery of the foil-backed plastic blister sheet. The opposite face of the card is the "coated" face.

Figure 4:
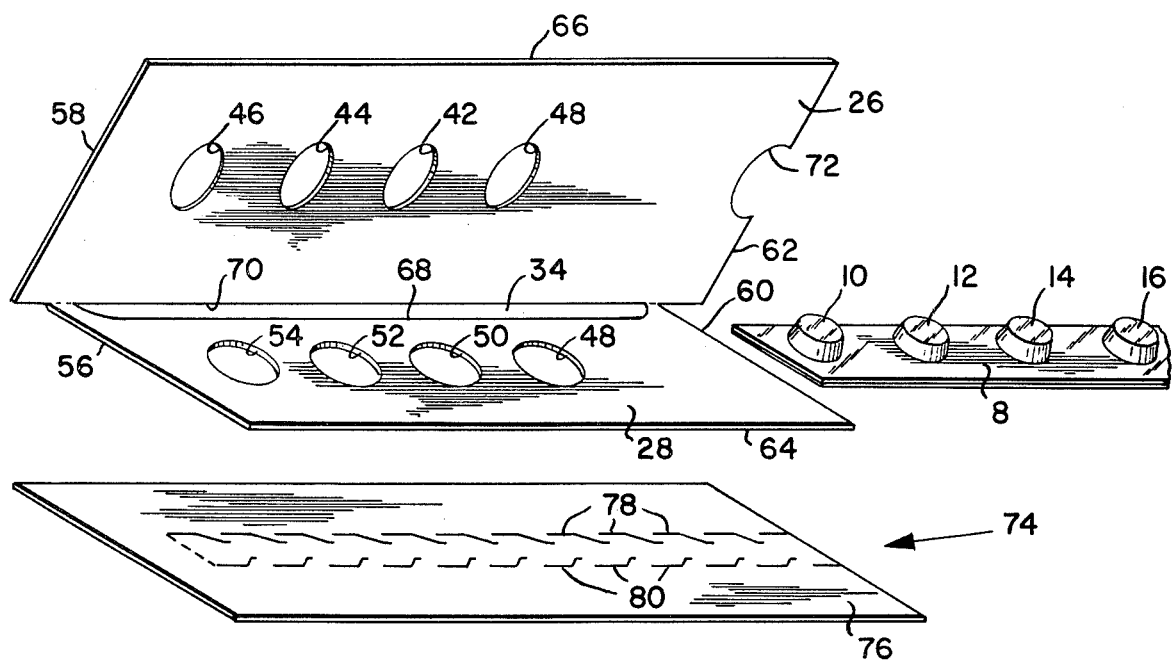
FIG. 4 is an exploded view of the complete blister package in accordance with the invention, illustrating the manner in which it is assembled.

The assembly of the entire blister package will be apparent from the exploded view in FIG. 4, which shows sheets 26 and 28 in a partially folded condition, the foil-backed blister sheet adapted to be secured in sandwich-fashion between sheets 26 and 28, and a backing sheet 74. The backing sheet is preferably a sheet of solid bleached sulfate, the upper side 76 of which is uncoated. Its dimensions preferably conform to those of sheet 26. Perforations 78 and 80 are formed to define a tear strip underlying holes 48, 50, 52 and 54, and removable to allow access to the contents of the blisters. The thickness of backing sheet 74 is such as to prevent the blister contents from being removed by manual compression of a blister when the backing sheet is in place behind the blister. Typically, the backing sheet is 14 point paperboard.

The package is assembled by positioning the foil-backed blister sheet against the adhesive-coated side of sheet 26, with blisters 10, 12, 14 and 16 projecting respectively through holes 46, 44, 42 and 40. Sheet 28 is then folded against the adhesive-coated side of sheet 26, thereby clamping the foil-backed blister sheet between sheets 26 and 28. Backing sheet 74 is then positioned against the exposed face of sheet 28. Positioning of the backing sheet is accomplished either manually, or automatically by means of a conventional transfer arm having suction means for picking up, holding and releasing the backing sheet at the proper times.

A margin area of sheet 26, extends substantially entirely around the periphery of sheet 28, and has an exposed heat-sealable coating. The heat-sealable adhesive within the margin area surrounding sheet 28 readily adheres, when heated, to the uncoated side 76 of backing sheet 74, to secure sheet 74 against the exposed face of sheet 28.

After the parts are assembled, sealing heat is applied, by means of a platen, throughout the area outside the borders of blister sheet 8, and within the borders of sheets 26 and 74. Sheets 26 and 28 and sheets 74 and 26 are heat-sealed together in a single heat-sealing step. The pressure of the platen pushes the margins of sheets 74 and 26 together within the area outside the borders of sheet 28.

Figure 5:
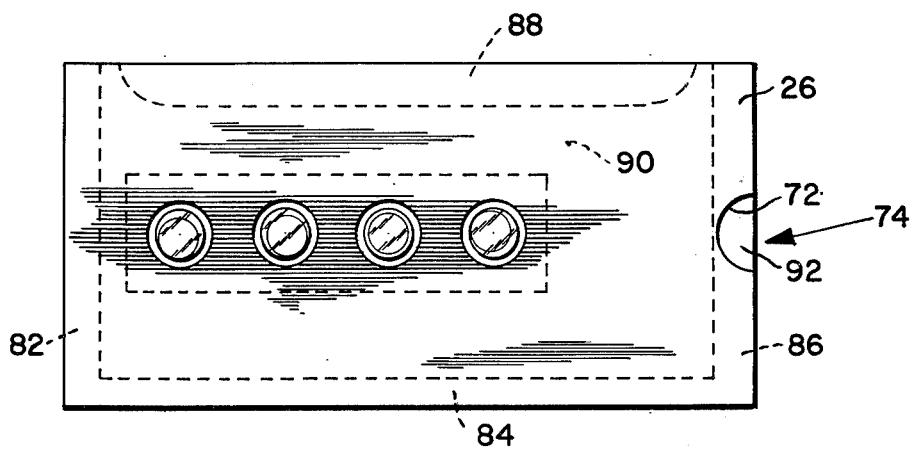
FIG. 5 is a top plan view of the blister package in accordance with the invention, illustrating the relationship between the various parts of the assembled package.

The manner in which the various elements are secured together will be apparent from FIG. 5. Sheet 74 is secured to sheet 26 by heat-sealable adhesive within the margin area, the parts of which are designated 82, 84, 86 and 88 respectively. Sheets 26 and 28 are secured together within margin area 90, which is the area outside the borders of the foil-backed blister sheet but within the borders of sheet 28.

The depth of notch 72 (i.e., the maximum distance from edge 62) is desirably at least 75% of the width of margin area 86 to prevent end 92 of that tear strip from becoming firmly secured to sheet 26 by heat-sealing.

Figure 6:
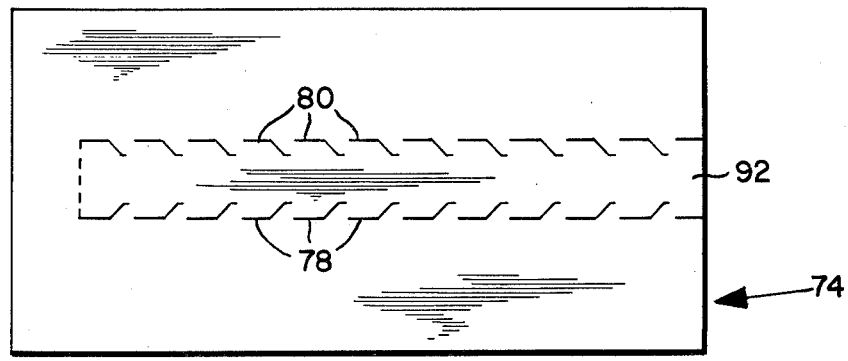
FIG. 6 is a bottom plan view of the package of FIG. 5, illustrating the configuration of the tear strip.

Referring to FIGS. 5 and 6, the package is opened by grasping end 92 of the tear strip defined by perforations 78 and 80. The tear strip is pulled away to expose the first hole 48 (FIG. 4) in sheet 28, making it possible to remove a tablet or capsule from within blister 16 by pushing downwardly on the outside of the blister to force the tablet or capsule through the foil sheet 18.

Except for a few cuts near end 92 of the tear strip, the cuts as shown in FIG. 6, are configured in such a way as to diverge from each other in the direction in which the tear strip is pulled, and then to run parallel to each other for a distance. This configuration, which is known in the packaging art, counteracts the tendency of the tear strip to taper to a point and thereby become useless. Importantly, it also enables the user to tear off excess tear strip material after each use, while still retaining an accessible tab so that the tear strip can be grasped and pulled easily to expose a next hole in sheet 28.

When the tear strip is in place, the backing sheet 74 prevents the removal of capsules or tablets from the foil-backed blister sheet, by providing a firm backing for foil layer 18. Two steps are required in order to gain access to a tablet or capsule. First, the tear strip must be pulled back to expose the appropriate hole in sheet 28. Then, the blister is depressed to force the tablet or capsule through the foil sheet. While these steps are relatively easy for an adult to accomplish, they are sufficiently difficult to discourage a small child.

With the exception of the backing sheet 74, the materials used in this package are the same as those used in the conventional blister package, the principal differences residing in the configuration of the card of FIG. 3, giving rise to the margin area for securing backing sheet 74 to sheet 26. By using a paperboard backing sheet 74 having an uncoated face 76 (FIG. 4), the backing sheet can be readily adhered to sheet 26 by heat-sealing, without impairing the operability of the tear strip.

Figure 7:
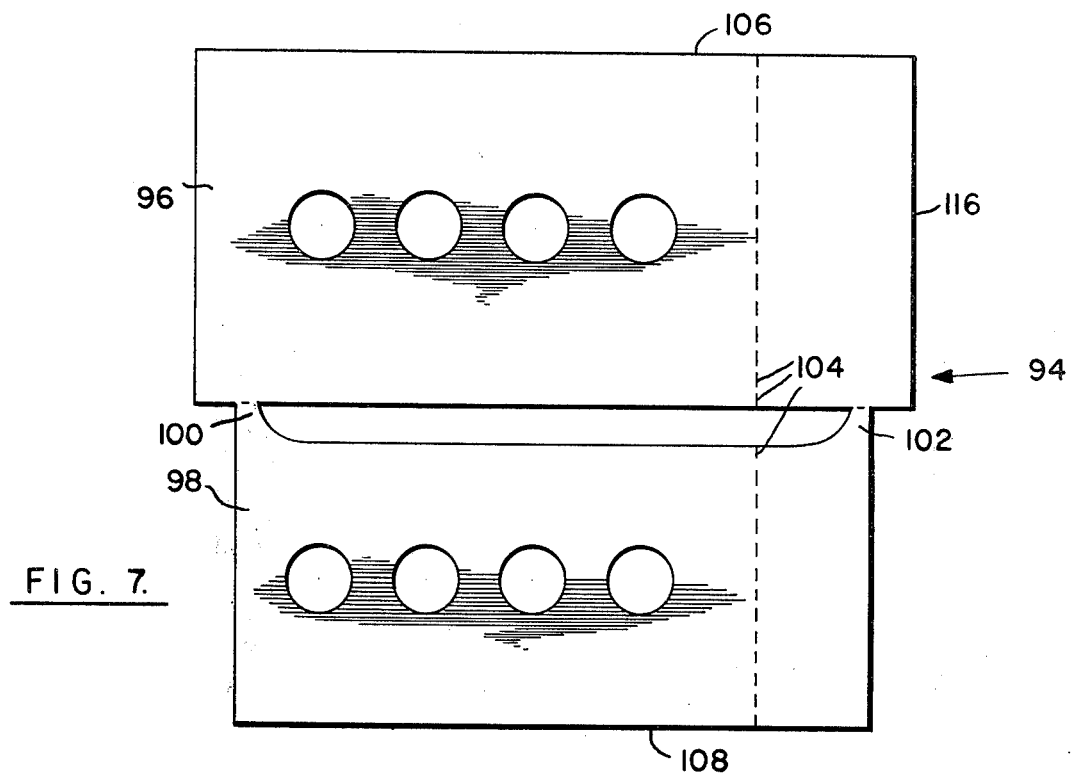
FIG. 7 is a top plan view of a card for use in the construction of an alternative package in accordance with the invention.
Figure 8:
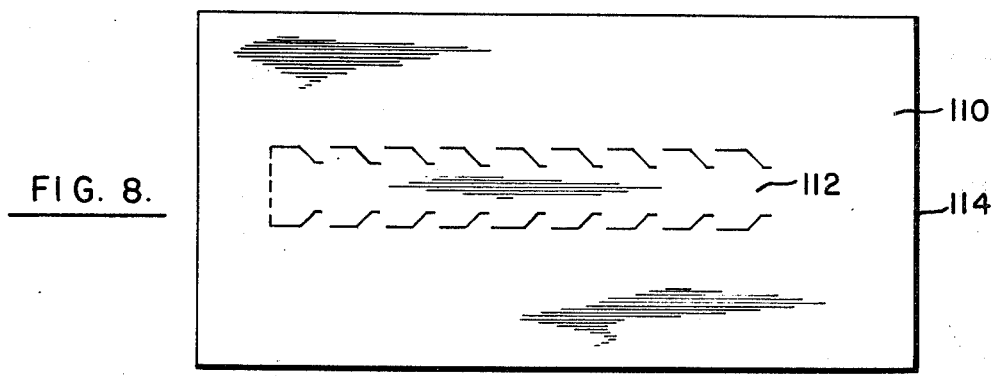
FIG. 8 is a bottom plan view of the alternative package.

An alternative version of the child-resistant package is shown in FIGS. 7 and 8, in which a card 94 is used. Card 94 is similar to the card shown in FIG. 3, in that it comprises two sheets 96 and 98 connected together by a pair of narrow hinge sections 100 and 102. Card 94 does not have a notch corresponding to notch 72. However, it does have a series of perforations 104 arranged in a line extending from edge 106 to edge 108, and the perforations are so arranged that the part of the line perforations in sheet 96 is superimposed on the part of the line in sheet 98 when the two sheets are folded over on each other.

A backing card 110, shown in FIG. 10, has a tear strip similar to the one in FIG. 6 except that it terminates at location 112, which is approximately the same distance from edge 114 of sheet 110 as perforations 104 are from edge 116 of sheet 96. Therefore, when sheet 110 is superimposed on sheet 96, perforations 104 are located adjacent location 112 at the end of the tear strip.

Except as indicated above the package of FIGS. 7 and 8 is substantially identical to that in FIGS. 1-6. Access to the tear strip is had by first separating the sections of the package on opposite sides of the line of perforations 104. The end of the tear strip is then grasped and pulled to permit removal of the blister contents.

Various modifications in the hole configuration, in the hinge configuration, in the number of holes, in the shapes of the cards, and various other modifications can be made to the specific packages, cards and methods described herein, without departing from the scope of the invention as defined in the following claims.

We claim:

1. A card for use in a child-resistant blister package comprising a first substantially flat paperboard sheet having a first hole extending from one face to the opposite face thereof, and a second substantially flat paperboard sheet having a second hole extending from one face to the opposite face thereof, said first and second sheets being integrally connected together by at least two narrow hinge sections, said hinge sections being spaced from each other and adapted to permit said sheets to be folded over on each other to secure a blister sheet between them, said holes being positioned so that they become coaxially aligned when said sheets are folded over on each other, both of said sheets being coated, at least on those portions of their faces which come into contact with each other, by a heat-sealable adhesive, and said second sheet having dimensions such that, when folded over on said first sheet, a margin area of said first sheet is presented which extends substantially entirely around the periphery of said second sheet, said margin area also being coated by a heat-sealable adhesive, the adhesive coating within said margin extending substantially entirely around the periphery of said second sheet.

2. A child-resistant blister package comprising:
   a sheet of plastic having a blister formed therein, projecting from one face thereof, and having an opening in the opposite face thereof, said blister containing a medicinal tablet or similar article;
   a foil sheet secured to one side of said plastic sheet, and enclosing the opening of said blister, said foil sheet being rupturable upon manual compression of the blister;
   a first paperboard sheet, overlying said plastic sheet on said one face thereof, and having a first hole extending from one face to the opposite face thereof, said blister projecting through said hole;
   a second paperboard sheet, overlying said foil sheet and having a second hole extending from one face to the opposite face thereof, said second hole being in registry with the opening of said blister;
   wherein the improvement comprises a third paperboard sheet overlying said second paperboard sheet, said third paperboard sheet having perforations defining a removable section overlying said second hole, said third paperboard sheet having sufficient thickness to prevent a tablet or similar article within the blister from being pushed through the foil sheet upon manual compression of the blister while said removable section is in place behind said blister, said third sheet and said first sheet extending beyond the borders of said second sheet throughout substantially the entire periphery thereof to form a margin area and being secured together by an adhesive within said margin area.

3. A child-resistant blister package according to claim 2 in which said first and second paperboard sheets extend beyond the borders of said plastic and foil sheets throughout substantially the entire periphery thereof to provide an additional margin area and are secured together by an adhesive within said additional margin area.

4. A child-resistant blister package according to claim 2 in which a face of said third sheet is uncoated and is adhered to said first sheet within said margin area by a heat-sealable adhesive.

5. A child-resistant blister package according to claim 2 wherein said first and second sheets are integrally connected to each other by at least two narrow hinge sections, spaced from each other and forming discontinuities in said margin area.

6. The method of making a child-resistant blister package for medicinal tablets and similar articles comprising the steps of:
   providing a first paperboard sheet having a first hole extending from one face to the opposite face thereof, and a heat-sealable adhesive coating on one face thereof;
   positioning a foil-backed blister sheet on the adhesive-coated side of said first sheet with its blister extending through said hole;
   positioning a second paperboard sheet, having a second hole extending from one face to the opposite face thereof, against the adhesive-coated side of said first sheet with said first and second holes in coaxial alignment, thereby clamping said foil-backed blister sheet between said first and second sheets;
   heat-sealing said first and second sheets together; and
   securing a third paperboard sheet having a removable section against the exposed face of said second sheet by heat-sealing said third sheet to a margin area of said first sheet said margin area extending beyond the borders of said second sheet throughout substantially the entire periphery thereof.

7. The method according to claim 6 in which the step of heat-sealing said third sheet to a margin area is characterized by the formation of a heat-sealed zone extending substantially completely around the periphery of said second sheet.

8. The method according to claim 6 in which the third sheet is uncoated on at least one side thereof and in which the step of heat-sealing said third sheet to a margin area is carried out by heat-sealing the uncoated side of said third sheet to said margin area.

9. The method according to claim 6 in which said first and second sheets are integrally connected to each other by a pair of narrow, spaced hinge sections and formed from a single sheet of paperboard having a heat-sealable adhesive coating on one side thereof; in which said third sheet is uncoated at least on one side thereof; and in which the step of heat-sealing said third sheet to a margin area is carried out by heat-sealing the uncoated side of said third sheet to said margin area.

10. The method according to claim 9 in which the step of heat-sealing said third sheet to the margin area is characterized by the formation of a heat-sealed zone extending substantially completely around the periphery of said second sheet.

* * * * *